United States Patent [19]

Fielding et al.

[11] Patent Number: 5,048,882
[45] Date of Patent: Sep. 17, 1991

[54] BARBECUE BASKET WITH REMOVABLE HANDLE

[75] Inventors: Douglas R. Fielding; Charles S. Adams, both of Berkeley, Calif.

[73] Assignee: Charcoal Companion, Berkeley, Calif.

[21] Appl. No.: 507,389

[22] Filed: Apr. 10, 1990

[51] Int. Cl.⁵ .............................................. A47J 45/00
[52] U.S. Cl. .................................. 294/33; 16/114 A; 99/394
[58] Field of Search .................. 16/114 A; 99/394; 294/27.1, 31.1, 32, 33; 220/94 R

[56] References Cited

U.S. PATENT DOCUMENTS

| | | | |
|---|---|---|---|
| 171,032 | 12/1875 | Meyers | 16/114 A |
| 634,224 | 10/1899 | Walton | 99/394 |
| 823,415 | 6/1906 | Krampitz | 16/114 A |
| 1,022,978 | 4/1912 | Stevenson | 294/27.001 |
| 1,155,838 | 10/1915 | Rose | 99/394 |
| 1,226,367 | 5/1917 | Potenza | 294/13 |
| 1,355,332 | 10/1920 | Hanson | 16/114 A |
| 1,587,350 | 6/1926 | Parke | 294/9 |
| 1,943,585 | 1/1934 | Cummins et al. | 294/21.001 |
| 2,023,521 | 12/1935 | Furnas | 294/33 |
| 2,281,015 | 4/1942 | Weise | 16/114 A |
| 2,362,395 | 11/1944 | Ozdobinski | 294/33 |
| 2,995,998 | 8/1961 | Howland | 16/114 A |
| 3,889,995 | 6/1975 | Lin | 294/33 |
| 4,482,181 | 11/1984 | Shepherd | 294/27.001 |

Primary Examiner—Johnny D. Cherry
Assistant Examiner—Cathleen Pringle
Attorney, Agent, or Firm—Owen, Wickersham & Erickson

[57] ABSTRACT

A removable handle for a barbecue basket having an attached mounting bracket with spaced apart flange portions, each flange portion having an opening of a predetermined shape. The handle comprises elongated tong arms connected together by an integral flexible portion at one end with a projection at an outer unconnected end of each said tong arm. The projection is shaped in cross-section so as to extend and seat within the flange openings in the mounting bracket so as to retain the handle at different selected angles relative to the basket. A spring urges the tong arms apart so that the end projections will be held in engagement with the mounting bracket when placed within the bracket openings.

9 Claims, 2 Drawing Sheets

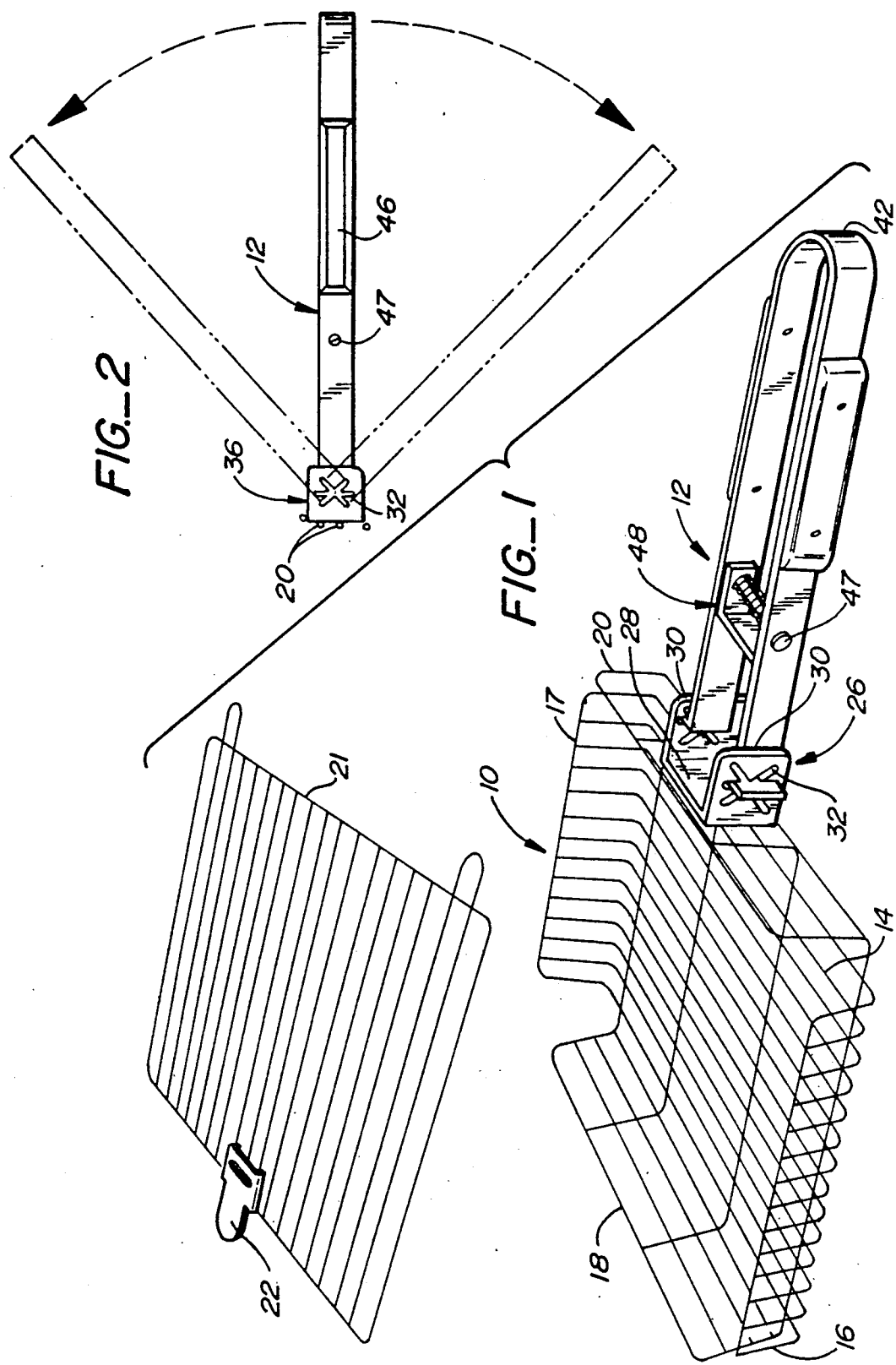

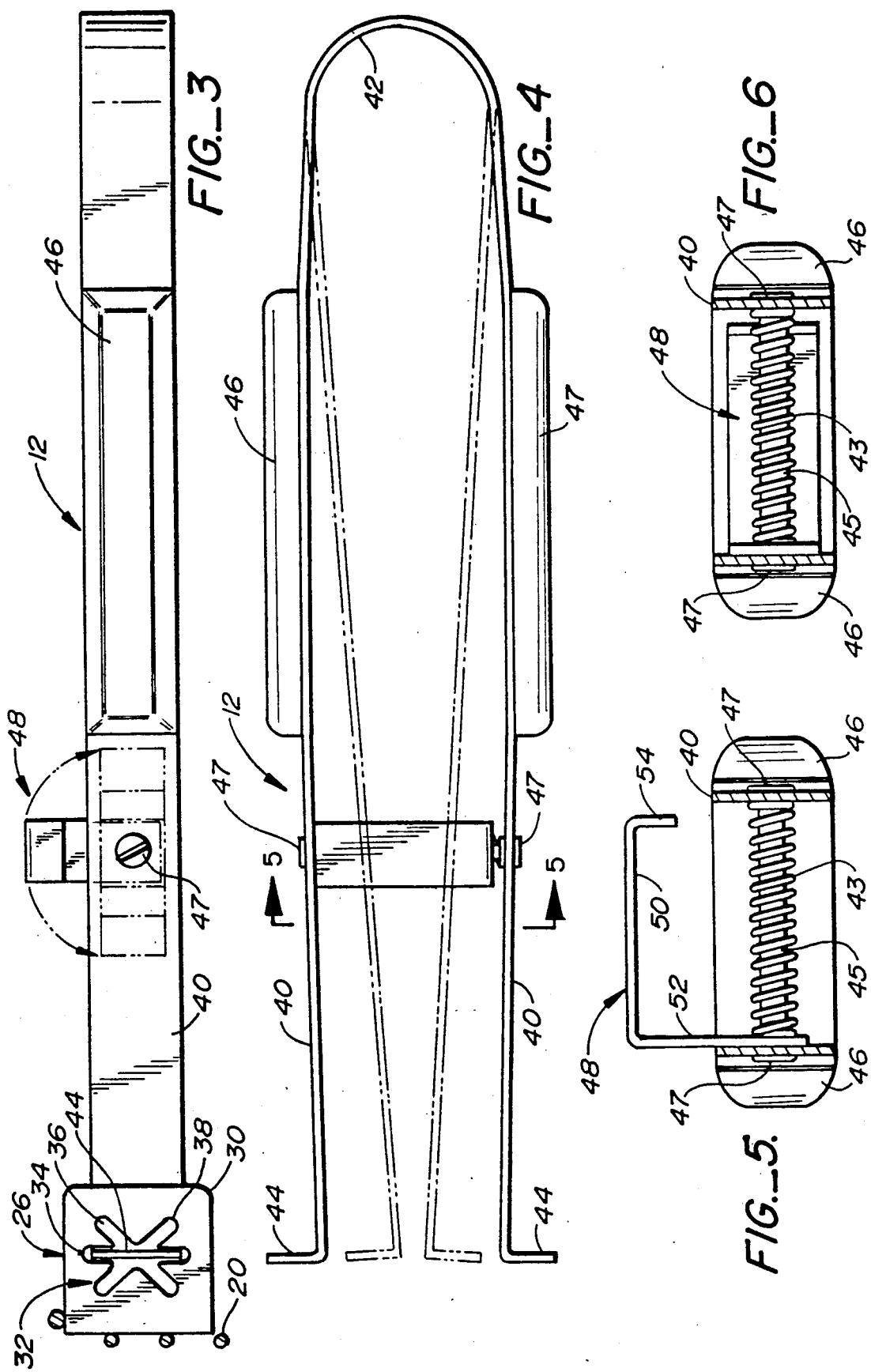

BARBECUE BASKET WITH REMOVABLE HANDLE

This invention relates to equipment used for grilling or barbecuing food, and more particularly to an adjustable handle for lifting and maneuvering a basket for holding food items during the cooking process.

BACKGROUND OF THE INVENTION

Persons who cook small items on a barbecue grill, i.e. shrimp, cut up vegetables, fish, often use a basket to hold the items. This is done so that the items do not fall through the cooking grate and because the basket makes it easier to turn the food so it cooks evenly on both sides.

One of the problems with using a basket for cooking is that the basket handle heretofore was fixed, not removable, and normally extended beyond the outer rim of the barbecue grill. Because the handle extended beyond the rim of the grill, it was not possible to close the top lid or cover of the barbecue cooker to stop flareups, slow cook or smoke foods. Consequently, prior to the present invention only baskets without handles could be used when it became necessary to close the barbecue cover and subsequently, when the cover was opened or removed, it was extremely difficult to remove or manipulate the basket.

It is therefore one object of the invention to provide a barbecue basket with a handle that is easily detachable from the basket head so that the top lid of the barbecue grill can be closed when the basket is inside the grill.

Another object of the invention is to provide a basket with a handle that detaches from the basket head so that the handle may be used with additional basket heads.

Still another object of the invention is to provide a removable handle for a barbecue basket or the like that is easy to attach to the basket or remove from it using only one hand and which is adjustable to extend from the basket at different preselected angles to accommodate various cooking situations.

Yet another object of the invention is to provide a removable and adjustable handle for a barbecue basket that is particularly well adapted for ease and economy of manufacture.

SUMMARY OF THE INVENTION

In accordance with the principles of the invention a barbecue basket comprised of connected and spaced apart wire elements is provided with a basket head or front wall having a "U" shaped bracket fixed thereto. Parallel and spaced apart flanges of the "U" extend outwardly from the basket wall handle and have irregular shaped female cutouts which allow the male basket handle ends to lock into place. The handle is made of a flat spring metal formed into an elongated "U" shape having a pair of tong arms. Each outer end of a tong arm terminates with an outward right angle bend, leaving ½" to 1" of an outward facing male flange. By squeezing the tong arms of the handle at a location between their opposite ends the outward facing "male" metal ends the tong arms are moved closer together and this enables the male end flanges to fit inside the flanges of the "U" shaped basket bracket. When the handle is released, the ends return to their original position with the male ends fitting into the female cutouts of the basket bracket. The bracket cutouts are shaped to provide three alternate positions for seating the end flanges of the tong arms thereby providing three different angular positions for the handle relative to the basket.

To increase the ability of the handle to return to its original shape with the tong arms slightly divergent, the handle is also fitted with an outward pushing spring between the tong arms and located about ⅔ of the way down the handle toward the male flange ends. In addition, to prevent the user from inadvertently squeezing the handle and disengaging it from the basket head during the turning of the basket while cooking, the handle is fitted with a pivotal lock which maintains the male flange ends within the bracket openings and prevents the tong arms from being moved closer together.

Other objects, advantages and features of the invention will become apparent from the following detailed description of one embodiment thereof, taken in conjunction with the accompanying drawing.

BRIEF DESCRIPTION OF THE DRAWING

FIG. 1 is an exploded view in perspective showing a barbecue basket having an adjustable handle embodying principles of the present invention.

FIG. 2 is a view in side elevation of the handle shown in FIG. 1, with "up" and "down" positions of the handle shown in phantom.

FIG. 3 is a somewhat larger view in elevation of the handle of FIG. 2.

FIG. 4 is a top view of the handle of FIG. 3 with deflected portions thereof shown in phantom.

FIG. 5 is a view in elevation and in section of the handle taken along line 5—5 of FIG. 4 and showing a movable lock member in its unlocked position.

FIG. 6 is a view similar to FIG. 5 showing the lock member in its locked position.

DETAILED DESCRIPTION OF EMBODIMENT

With reference to the drawing, FIG. 1 shows a typical barbecue basket 10 having an adjustable and removable handle 12 embodying the principles of the invention. The basket is adapted to retain such food items as vegetables, fish or meat portions when they are cooked or grilled, usually over live coals within a barbecue cooker having a lid or cover. As indicted, the basket is constructed from a stiff wire material comprised of spaced apart and welded together elements that form a bottom section 14 with bent up portions that form opposite side wall members 16, 17, a back wall member 18 and a front wall member 20.

A wire cover 21 for the basket 10 is provided which is comprised of a series of spaced apart wire elements having essentially a planar rectangular shape. Attached to an adjacent pair of centrally located wire elements on the cover is a metal tab member 22 which serves to connect the cover to the back wall of the basket and enable it to move relative to the basket. Fixed, as by welding, to the front wall member 20 of the basket 10 is a U-shaped mounting bracket 26 having a central web 28 and two spaced apart and parallel flange portions 30 at the ends of the web. The bracket web is firmly attached to the spaced apart wire elements of the basket so that the flange portions 30 extend outwardly from the front wall member 20. The bracket flange portions are each provided with a female opening 32 having an irregular shape that is oriented in precisely the same position on each flange portion. As shown in FIG. 3, each opening 32 is formed from three intersecting slots of equal width. On each flange, a first slot 34 is vertical or perpendicular to opposite side edges of the flange.

The other two slots, 36 and 38 forming the opening 32, intersect the first slot at its center at an angle (e.g. 60°). Thus, the opening 32 is shaped to accept a member having an elongated rectangular cross-section in three alternative positions, spaced angularly apart (e.g. 120°), as defined by the three intersecting slots that form the opening. This enables the handle 12 to be attached in either "level" or "up" or "down" positions, as shown in FIG. 2.

The handle 12, as illustrated in FIGS. 1-4, comprises an elongated tong-like device made from a single piece of flat metal, preferably spring steel, which is bent in a U-shaped configuration. Thus, the device has a pair of elongated tong-like arms 40 of uniform length which are integral with a flexible connecting portion 42 at its outer end. At the outer end of each tong arm is an outwardly extending male flange 44 having a length of one-half to one inch. Each of these flanges 44 on the tong arms 40 has a rectangular cross-section whose length and width are slightly less than the length and width of the intersecting slots 34, 36 and 38 forming the irregular female openings 32.

In the unrestrained configuration, the flexible connecting portion 42 of the handle 12, aided by a coiled spring 43 between the tong arms, normally urges the tong arms apart or toward a slightly divergent position, as shown in FIG. 4. A pin 45 extends through the spring transverse to the tong arms and has enlarged head portions 47 at opposite ends which limit the distance between the tong arms. When the tong arms are held against the head portions of the pin 45 by the spring 43, the outer ends of the tong arms are positioned just inside the bracket flanges 30 and their male flanges 44 at the ends of the tong arms extend considerably wider apart than the flange portions 30 on the basket mount 26. Thus, when the handle is attached to the bracket 26, the flanges 44 are maintained within a selected pair of slots of the openings 32 by the force of the spring 43. Now, when the tong arms are forced together so as to slightly converge at their ends, their end flanges 44 are moved closer together so that they can be disengaged and removed from the openings 32 of the mounting bracket 26. Fixed along the outer surface of each tong arm, by a suitable means such as an adhesive or rivets, is an elongated gripping member 46. Each gripping member is preferably made of a material such as wood or plastic which does not readily conduct heat from the attached metal tong arm. Also, these gripping members are located so that a user can easily grip the handle in on hand a apply sufficient ripping force to move the tong arms together.

When the tong arms 40 are squeezed together so as to be slightly convergent they will fit just inside the flange portions of the mount 26 with the tong arm flanges 44 extending through a selected pair of slots in the female openings 32 in the flange portions 30. In this attached position, the tong arms of the handle 12 may be locked in place by means of a pivotal member 48. As shown in FIGS. 3-5, this locking member has an elongated center portion 50 of rigid material and a pair of first and second flanges 52 and 54 extending at right angles from the center portion. The first flange 52 is somewhat longer than the second flange 54 and is pivotally mounted on the cylindrical pin 56 extending between the tong arms. The coiled spring 43 around the pin 45 between the tong arms retains the first flange 52 against its tong arm and also urges the tong arms apart.

When the handle is in its attached position on the basket 10 with the end flanges 44 seated within opposite openings 32 in the flange portions of the basket mount, the locking member 48 is rotated on the pin 56 so that the second flange 54 provides a stop that prevents the tong arms from being squeezed together inadvertently so as to release or disengage the handle.

Conversely, when the handle is to be moved to a different position on the basket mount, the locking member 48 is merely rotated so that the second flange 54 no longer blocks the adjacent tong arm, thereby allowing the tong arms to be squeezed together to facilitate removal of the tong arm flanges 44 from the slots of the openings 32 in the basket mount.

The various angles of the three slots 34, 36 and 38 in the basket mount 26 enable a user of the barbecue basket 10 to maneuver the handle 12 in any one of a variety of positions which may be necessary to accommodate different barbecue facilities and cooking or grilling conditions. For each adjustment of the handle a user with one hand can manipulate the handle easily to attach it to and remove it from the basket mount. Once attached the handle is firmly connected so that the basket can be moved easily to any desired location. Obviously, the same handle 12 can be used to move or manipulate several baskets at different times as well as other devices that are provided with the mounting 26 with its openings 32.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

What is claimed is:

1. In combination, a barbeque basket for retaining food items to be cooked and a removable handle for lifting and moving said basket, said basket comprising:
   a bottom section and a front wall section extending upwardly from said bottom section;
   a fixed mounting bracket attached to said front wall section having a pair of outwardly extending spaced apart flange portions, each flange portion having an opening of a predetermined shape; said handle comprising:
   a generally U-shaped member having a pair of elongated tong arms connected together by an integral flexible portion at one end, a projection means at an outer unconnected end of each said tong arm said projection means being shaped in cross-section so as to extend and seat within a said opening in said mounting bracket; said openings in said flange portions of said mounting bracket each having an irregular shape formed by a plurality of intersecting slots, each slot being shaped to receive a projection on a tong arm; and
   means for urging said tong arms apart so that said projection means will be held in engagement with said mounting bracket when placed within said bracket openings.

2. The device as described in claim 1 wherein said openings in said flange portions of said bracket each have a shape formed by three slots which intersect at the center of the opening.

3. The device as described in claim 2 wherein said three slots are angularly spaced apart by 120° so that said handle can be attached to said basket in either level, angled up or angled down positions.

4. The device as described in claim 1 wherein said tong arms are comprised of flat metal members of uniform cross-section and said projection means comprise end flanges which extend outwardly from each arm at a right angle thereto.

5. The device as described in claim 4 wherein each said end flange has a rectangular cross-section and a length of from one-half to one inch.

6. The device as described in claim 1 wherein said means for urging said tong arms apart includes a spring means positioned between said tong arms.

7. The device as described in claim 6 including a transverse pin means adjacent said spring means, extending through said tong arms and having enlarged end portions for limiting the distance that said tong arms can be spread apart.

8. The device as described in claim 1 including a locking means on said handle for preventing said tong arms from being moved together inadvertently when said projection means are seated within said openings in said flange portions.

9. In combination, a barbeque basket for retaining food items to be cooked and a removable handle for lifting and moving said basket, said basket comprising:

a bottom section and a front wall section extending upwardly from said bottom section;

a fixed mounting bracket attached to said front wall section having a pair of outwardly extending spaced apart flanges portions, each flange portion having an opening of a predetermined shape; said handle comprising:

a generally U-shaped member having a pair of elongated tong arms connected together by an integral flexible portion at one end, a projection means at an outer unconnected end of each said tong arm said projection means being shaped in cross-section forming end flanges so as to extend and seat within a said opening in said mounting bracket; and means for urging said tong arms apart so that said projection means will be held in engagement with said mounting bracket when placed within said bracket openings, a locking means on said handle for preventing said tong arms from being moved together inadvertently when said projection means are seated within said openings in said flange portions, said locking means comprising a transverse pin extending between said tong arms, a locking member pivotal mounted on said pin comprised of a central portion with end portions bent at generally a right angle to said central portion, said end portions being spaced apart by a distance between the tong arms which is sufficient to retain said tong arm end flanges within said bracket openings.

* * * * *